United States Patent
August et al.

(10) Patent No.: US 10,684,909 B1
(45) Date of Patent: Jun. 16, 2020

(54) ANOMALY DETECTION FOR PRESERVING THE AVAILABILITY OF VIRTUALIZED CLOUD SERVICES

(71) Applicant: THE UNITED STATES OF AMERICA AS REPRESENTED BY THE SECRETARY OF THE NAVY, San Diego, CA (US)

(72) Inventors: Michael A. August, San Diego, CA (US); Mamadou H. Diallo, Santee, CA (US); Dillon P. Glasser, New York City, NY (US); Christopher T. Graves, San Diego, CA (US); Roger A. Hallman, San Diego, CA (US); Scott M. Slayback, San Diego, CA (US)

(73) Assignee: United States of America as represented by Secretary of the Navy, Washington, DC (US)

( * ) Notice: Subject to any disclaimer, the term of this patent is extended or adjusted under 35 U.S.C. 154(b) by 190 days.

(21) Appl. No.: 16/106,740

(22) Filed: Aug. 21, 2018

(51) Int. Cl.
| | | |
|---|---|---|
| *G06F 11/00* | (2006.01) | |
| *G06F 11/07* | (2006.01) | |
| *G06F 9/455* | (2018.01) | |

(52) U.S. Cl.
CPC ........ *G06F 11/079* (2013.01); *G06F 9/45533* (2013.01); *G06F 11/0709* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 7,406,653 B2 * | 7/2008 | Ide | ........................ | G06F 16/35 |
| | | | | 714/799 |
| 8,612,599 B2 * | 12/2013 | Tung | ................... | G06F 11/3495 |
| | | | | 709/226 |

(Continued)

FOREIGN PATENT DOCUMENTS

| | | |
|---|---|---|
| WO | 2013090910 | 6/2015 |
| WO | 2017118133 | 7/2017 |

OTHER PUBLICATIONS

Knorn, F., et al., "Adaptive kalman filtering for anomaly detection in software appliances," IEEE INFOCOM Workshops, pp. 1-6, Apr. 2008.

(Continued)

*Primary Examiner* — Amine Riad
(74) *Attorney, Agent, or Firm* — Naval Information Warfare Center, Pacific; Kyle Eppele (57) ABSTRACT

A system and method that automatically detects anomalies in a cloud service system on an ongoing basis and which can be used to trigger live migration of cloud services includes a cloud server system configured to provide a plurality of virtualized cloud services through processes running over a set of virtual machines hosted on the cloud server system, and a processor which receives data related to the operations of the virtual machines and determines whether any of the virtual machines are exhibiting anomalous behavior. The processor applies a Kalman Filter to make predictions on the future state and covariance of the virtual machines and then calculates the log likelihood of the predicted values. If the predicted values deemed to be very unlikely, then the processor signals that an anomaly has occurred.

20 Claims, 7 Drawing Sheets

(52) U.S. Cl.
CPC ...... *G06F 11/0712* (2013.01); *G06F 11/0751* (2013.01); *G06F 11/0772* (2013.01)

(56) References Cited

U.S. PATENT DOCUMENTS

| | | | | |
|---|---|---|---|---|
| 8,688,620 | B2* | 4/2014 | Viswanathan | G06F 11/076 706/62 |
| 8,868,474 | B2* | 10/2014 | Leung | G06F 11/0751 706/12 |
| 8,914,317 | B2 | 12/2014 | Biem | |
| 8,924,333 | B2 | 12/2014 | Biem | |
| 9,038,180 | B2* | 5/2015 | Neil | G06N 5/02 726/23 |
| 9,152,530 | B2* | 10/2015 | Gross | G06F 11/141 |
| 9,218,570 | B2 | 12/2015 | Biem | |
| 9,332,024 | B1 | 5/2016 | Gulko | |
| 9,411,009 | B1 | 8/2016 | Gonzalez et al. | |
| 9,628,499 | B1 | 4/2017 | Yu et al. | |
| 10,565,080 | B2* | 2/2020 | Yuan | G06F 11/3089 |
| 2014/0372347 | A1* | 12/2014 | Cohen | G06F 11/0793 706/12 |
| 2015/0142384 | A1* | 5/2015 | Chao | G06F 11/3089 702/181 |
| 2016/0062950 | A1 | 3/2016 | Brodersen et al. | |
| 2016/0164721 | A1 | 6/2016 | Zhang et al. | |
| 2017/0330096 | A1 | 11/2017 | Green et al. | |

OTHER PUBLICATIONS

Wang, G., et al., "An anomaly detection framework for detecting anomalous virtual machines under cloud computing environments," International Journal of Security and its Applications, vol. 10, No. 1, pp. 75-86, 2016.

Wang, G, et al., "An environment-aware anomaly detection framework of cloud platform for improving its dependability," Proceedings of the International Conference on Parallel and Distributed Processing Techniques and Applications, The Steering Committee of the World Congress in Computer Science, Computer Engineering and Applied Computing (WorldComp), p. 431, 2015.

De Gooijer, J.G., et al., "25 years of time series forecasting," Int. Journal of Forecasting, vo. 22, No. 3, pp. 443-473, 2006.

Liu, J., et al., "An anomaly detection algorithm of cloud platform based on self-organizing maps," Mathematical Problems in Engineering, vol. 2016, 2016.

Goldstein, M., et al., "A comparative evaluation of unsupervised anomaly detection algorithms for multivariate data," PLoS One, vol. 11, No. 4, 2016.

Pandeeswari, N., et al., "Anomaly detection system in cloud environment using fuzzy clustering based ann," Mob. Netw Appl., vol. 21, No. 3, pp. 494-505, Jun. 2016.

Kalman, R.E., et al., "A new approach to linear filtering and prediction problems," Journal of Basic Engineering, vol. 82, No. 1, pp. 35-45, 1960.

\* cited by examiner

| Name | Type | Description |
|---|---|---|
| S | N | Dimension of the State |
| N | N | Dimension of the Observation |
| Trans | $R^{S \times S}$ | State Transition Matrix |
| $Trans_\sigma$ | $R^{S \times 1}$ | State Covariance Matrix |
| TransOffset | $R^{S \times 1}$ | Offset of the State |
| Obs | $R^{N \times N}$ | Observation Matrix |
| $Obs_\sigma$ | $R^{N \times N}$ | Covariance of the Observation |
| ObsOffset | $R^{N \times 1}$ | Offset of the Observation |
| $PredictedState_\mu$ | $R^{S \times 1}$ | Predicted State |
| $PredictedState_\sigma$ | $R^{S \times 1}$ | Covariance of the Predicted State |

FIG. 3

```
 1: # Refer to Figure 3 for description of the kf object
 2: function ANOMALYDETECTOR(vm, kf)
 3:     while true do
 4:         data = getData(vm)
 5:         result = update(data, kf)
 6:         if result < 0 then
 7:             reportAnomaly(vm, result)
 8:         end if
 9:     end while
10: end function
11:
12: function UPDATE(D, kf)
13:     $F_\mu, F_\sigma$ = filterUpdate(kf, D)
14:     kf.curState$_\mu$ = $F_\mu$
15:     kf.curState$_\sigma$ = $F_\sigma$
16:     return loglikelihood(kf, D)
17: end function
18:
19: function FILTERUPDATE(kf, D)
20:     $P_\mu$ = kf.trans . kf.curState$_\mu$ + kf.transOffset
21:     $P_\sigma$ = kf.trans . (kf.curState$_\sigma$ . kf.trans$^T$) + kf.trans$_\sigma$
22:     $O_\mu$ = kf.obs . $P_\mu$ + kf.obsOffset
23:     $O_\sigma$ = kf.obs . ($P_\sigma$ . kf.obs$^T$) + kf.obs$_\sigma$
24:     K = $P_\sigma$ . (kf.obs$^T$ . ($O_\sigma^{-1}$))
25:     Corrected$_\mu$ = $P_\mu$ + K . (kf.obs - $O_\mu$)
26:     Corrected$_\sigma$ = $P_\sigma$ - (K . (kf.obs . $P_\sigma$))
27:     kf.predictedstate$_\mu$ = $P_\mu$
28:     kf.predictedstate$_\sigma$ = $P_\sigma$
29:     return Corrected$_\mu$, Corrected$_\sigma$
30: end function
31:
32: function LOGLIKELIHOOD(kf, D)
33:     $P_{mean}$ = kf.obs . kf.predictedState$_\mu$ + kf.obsOffset
34:     $P_\sigma$ = kf.obs . (kf.predictedState$_\sigma$ . kf.obs$^T$) + kf.obs$_\sigma$
35:     return logMultivariate Normal Density(D, $P_{mean}$, $P_\sigma$)
36: end function
```

ANOMALY DETECTION FOR PRESERVING THE AVAILABILITY OF VIRTUALIZED CLOUD SERVICES

FEDERALLY SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif. 92152; telephone (619) 553-5118; email: ssc_pac_t2@navy.mil. Reference Navy Case No. 107938.

BACKGROUND

Cloud data centers rely on virtualization to enable cloud service portability. Services hosted in the cloud are typically deployed as sets of applications/processes running on one or more Virtual Machines (VMs). In this regard, the services hosted in the cloud that are running on VMs may be referred to as virtualized cloud services.

Using live migration technology, a cluster of VMs running multiple applications associated with a single service can be moved together as one unit from one subnet to another, thereby ensuring co-location of the VMs hosting a service and minimizing latency between VMs. This live migration technique is used in data centers to perform various tasks including IT maintenance, load balancing, power management, and development-to-operations support.

For example, the use of live migration as a mechanism for improving resilience/availability of cloud services is described in U.S. patent application Ser. No. 15/604,552 to Diallo et al. ("552 application"), also owned by Applicant, the content of which is fully incorporated by reference herein. Assumed was a cloud infrastructure as a service (IaaS) model where cloud service providers manage virtual machine instances and offer them as a service to customers. When there is an anomaly in a cloud infrastructure that results in disruption of the cloud (i.e., the cloud servers are no longer functional), then VMs will need to be migrated to preserve the availability of the services they are providing. But in order to efficiently migrate cloud services, it must be determined when to migrate cloud services, what virtual machines to select to migrate, and where to migrate the selected virtual machines. A virtual machine selection algorithm that maximizes the availability of high priority services during migration under time and network bandwidth constraints operates to address what virtual machines to select to migrate and where to migrate the selected virtual machines.

The success of live migration of virtual machines for preserving the availability of cloud services still ultimately depends on efficient mechanisms for detecting anomalies in the underlying virtual machines running the cloud services so as to determine when to migrate cloud services. Anomaly detection is the problem of identifying outliers in a dataset. The outliers are identified relative to a baseline of normal or expected data. In order to generate a baseline of normal data, historical data is collected and stored for future reference by the anomaly detection algorithm. Anomaly detection algorithms fit into one of three broad categories: unsupervised, supervised, and semi-supervised. Unsupervised anomaly detection algorithms assume that most data in a given dataset are normal, and only the data points that deviate the most from the data set are identified as anomalous. Supervised anomaly detection algorithms require a dataset with data points labeled as normal or abnormal in order to train a classifier to differentiate between the two classes. Semi-supervised anomaly detection algorithms take a normal dataset as input to build a model representing normal behavior in the system, and then output the probability that a given data point could be generated by the model that was built.

One technique used to detect anomalies in VMs in a cloud environment is the Kalman Filter, which is a typical time series forecasting algorithm. The Kalman Filter is a set of equations that implement a linear predictor-corrector estimator in the time domain that minimizes the estimated error covariance. The Kalman Filter enables forecasting of time series data, and can be used to identify data points that vary significantly from the forecast.

A need exists for an approach that extends the basic Kalman Filter and recursively adapts the input gains, the noise, and measurement covariances to achieve ongoing, automated operation, as well as an approach to use a moving average filter on the log likelihoods of past measurements to produce a more robust anomaly indicator.

DETAILED DESCRIPTION OF SOME EMBODIMENTS

Described herein are a self-managing system and method for detecting anomalies in cloud services. The underlying algorithm of the invention is based on the Kalman Filter and makes use of parameters such as CPU, memory, and network loads. Unlike previous approaches for detecting anomalies in VMs, the approach described herein considers the detection of anomalies in a cloud service, which depends on one or more virtual machines. Advantageously, the system and method described herein consider the detection of anomalies in groups of VMs rather than in a single VM, thereby operating to speed up the detection process.

With the present ongoing, automated anomaly detection system and method, it is appreciated that anomalous behavior on a VM could be indicative of a cyber-attack currently underway or the presence of other anomalies. Since the VM exhibiting anomalous behavior is part of a larger cloud service, once an anomaly is detected within the VM, the automatic live migration system and method described in the '552 application autonomously triggers the migration of all of the VMs constituting that cloud service in order to ensure its availability.

Alternatively, the detection of anomalous data can be used to focus a cyber analyst's attention on the VM's log data in order to determine whether or not the VM is actually under attack. The data collected by automated anomaly detection system and method is time series data about each VM. For example, this time series data could include CPU utilization, memory usage, network I/O, or disk I/O for each VM in the cloud service being monitored.

The Kalman Filter employed by the system and method described herein predicts the state of a system based on its previous state, given the assumption that the measured inputs to the system and the noise associated with those measurements are all normally distributed. The operation of the Kalman Filter can be expressed with reference to Table 1 as follows:

TABLE 1

| Variable | Description |
| --- | --- |
| k | Time step |
| $x_k$ | Predicted current state vector |
| $F_k$ | State transition matrix |
| $w_k$ | Estimated noise |
| $P_k$ | Covariance of the predicted state |
| $Q_k$ | Covariance of the predicted noise |
| $z_k$ | Observed value |
| $H_k$ | Observation matrix |
| $v_k$ | Observation noise |
| $S_k$ | Covariance of the observed state |
| $R_k$ | Covariance of the observed noise |
| $K_k$ | Kalman gain |
| $\hat{x}_k$ | Updated state estimate |
| $\hat{P}_k$ | Covariance of the updated state |

Let $x_k$ be the current state vector for the system at time step k, and $x_{k-1}$ be the previous state vector for the system at time step k−1. Let $F_k$ be the state transition matrix, and $w_{k-1}$ be the estimated noise in the previous time step k−1 based on a normal distribution. Then, the current state can be predicted from the previous state using the linear Kalman Filter through the following recurrence relation:

$$x_k = F_k x_{k-1} + w_{k-1} \quad \text{(Eq. 1)}$$

Once the current state is predicted, the covariance of this predicted state estimate is also calculated. Let $P_k$ be the predicted state covariance at time step k, $P_{k-1}$ be the predicted state covariance at time step k−1, and $Q_k$ be the covariance of the predicted noise. The covariance of the predicted state is calculated with the following recurrence relation:

$$P_k = F_k P_{k-1} F_k^T + Q_k \quad \text{(Eq. 2)}$$

At each time step k, an observation $z_k$ is made. This observation is made of the state $x_k$ through an observation matrix $H_k$. The observation matrix maps the state space into the space of observed values. Let $v_k$ be the observed noise, which is also assumed to have a Gaussian distribution, and let $R_k$ be the covariance of the observed noise at time step k. Therefore, the observed state at time step k is:

$$z_k = H_k x_k + v_k \quad \text{(Eq. 3)}$$

Let $S_k$ be the covariance of the observed state, defined by:

$$S_k = H_k P_k H_k^T + R_k \quad \text{(Eq. 4)}$$

It is assumed that the noise vectors $w_{k-1}$ and $v_k$ are mutually independent.

At each time step k, the observed (measured) value is used to adjust the predicted state. This adjustment corrects the predicted state to the actual measured value as a feedback mechanism to improve the prediction at the next time step. This is referred to as the update step. During the update step, a gain factor, the Kalman Gain, is calculated to determine the weight associated with the measurement, which determines how much the predicted state is updated by the measured value. The Kalman Gain is defined as:

$$K_k = P_k H_k^T (H_k P_k H_k^T + R_k)^{-1} = P_k H_k^T (S_k)^{-1} \quad \text{(Eq. 5)}$$

Let $\hat{x}_k$ be the updated state estimate incorporating the actual measured value $z_k$, and $\hat{P}_k$ be the error covariance for the updated state estimate. The equation for the updated state estimate is:

$$\hat{x}_k = x_k + K_k(z_k - H_k x_k) \quad \text{(Eq. 6)}$$

The error covariance for the updated state estimate is:

$$\hat{P}_k = (I - K_k H_k) P_k \quad \text{(Eq. 7)}$$

When the observed value $z_k$ at time step k is outside of the confidence interval around its predicted value $x_k$, then we say that an anomaly has been detected.

Referring now to FIGS. 1, 2, 3, and 4, the system and method for ongoing anomaly detection 100 is designed to use a processor 110 to monitor a plurality of individual VMs 120 in a cloud server system 130 to detect anomalies in real-time. The processor 110 may be disposed in a computer system that includes memory and a user interface and is physically and/or logically separate from the VMs 120 in the cloud server system 130. The ongoing anomaly detection software application that causes the processor to execute the AnomalyDetector algorithm may be stored on the memory. Alternatively, the ongoing anomaly detection software application may be accessible to the processor 110 through a computer network to which the processor 110 is connected.

Figure 1:
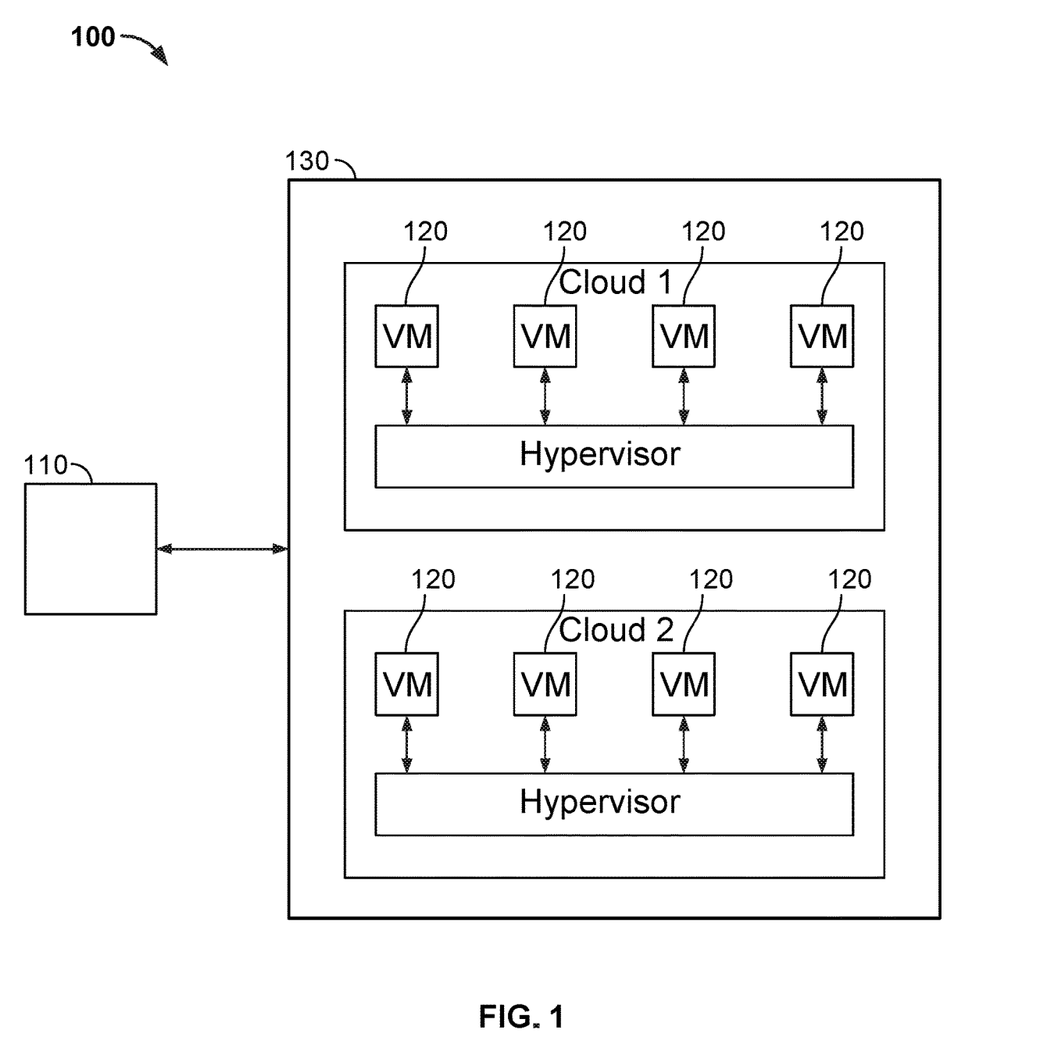
FIG. 1 shows a block diagram of the architecture of an ongoing anomaly detection method in accordance with the present disclosure.
Figure 2:
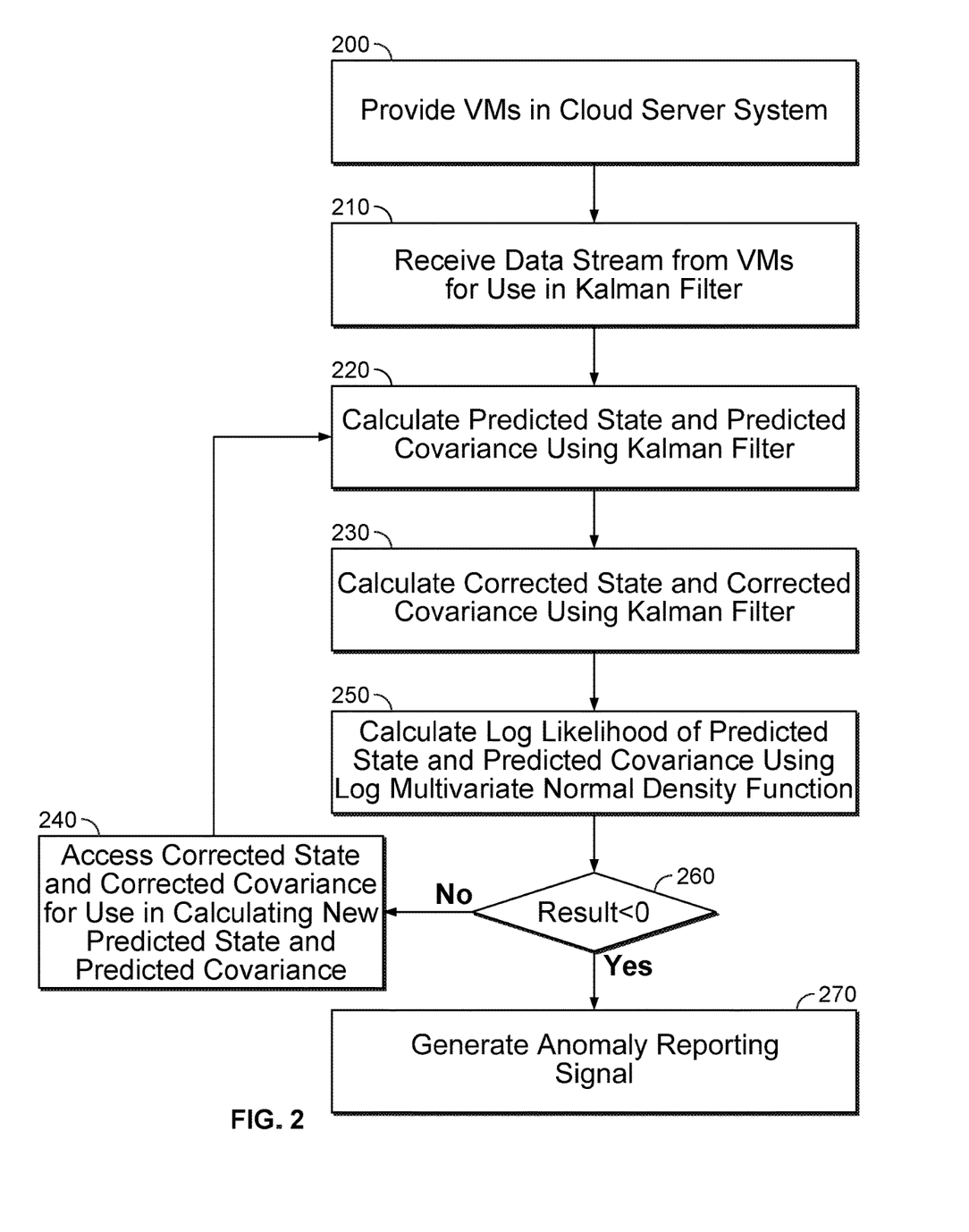
FIG. 2 shows the steps of an ongoing anomaly detection method in accordance with the present disclosure.
Figure 3:
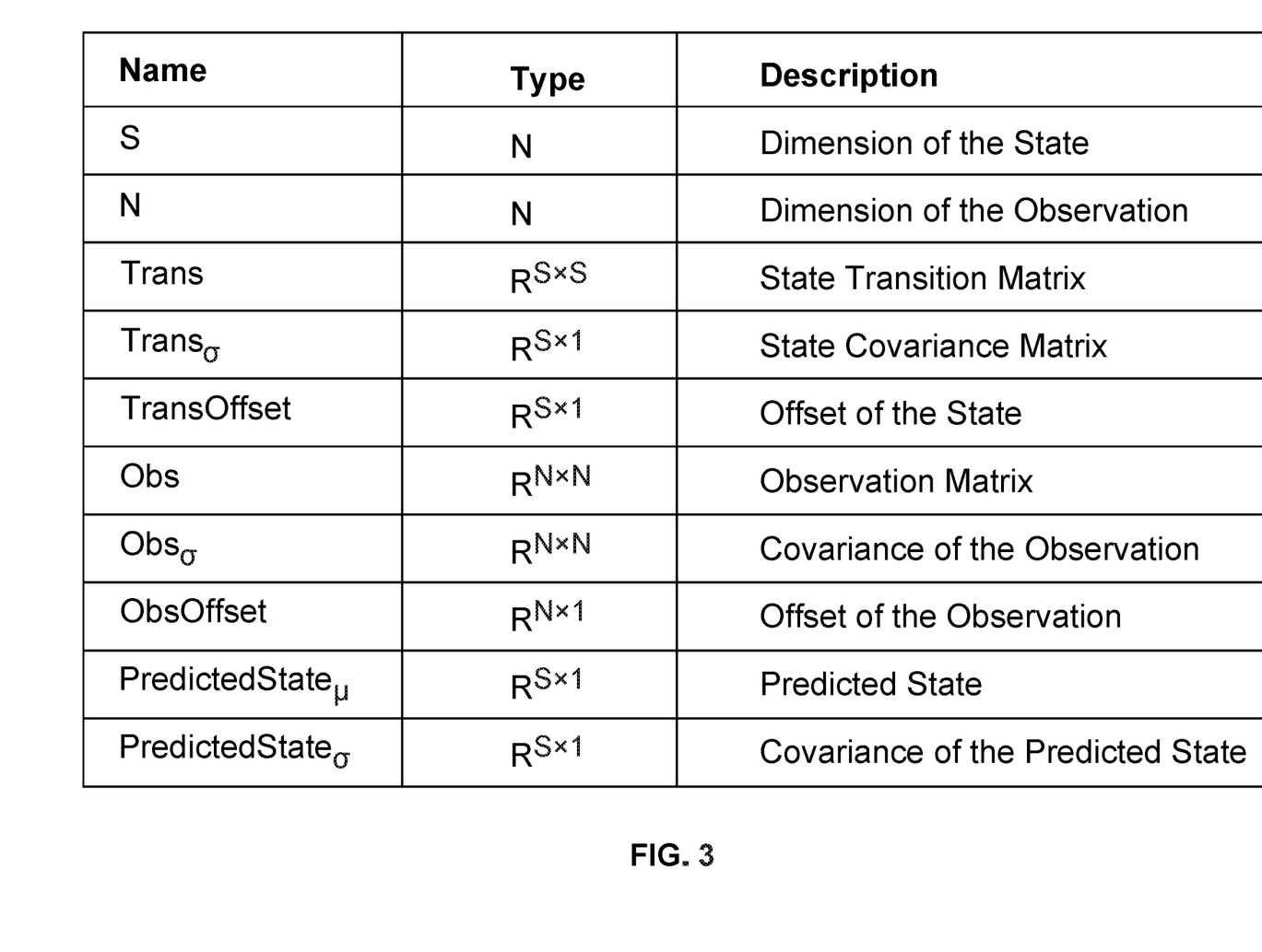
FIG. 3 shows a table of variables used by the Kalman Filter of the disclosed anomaly detection system and method.
Figure 4:
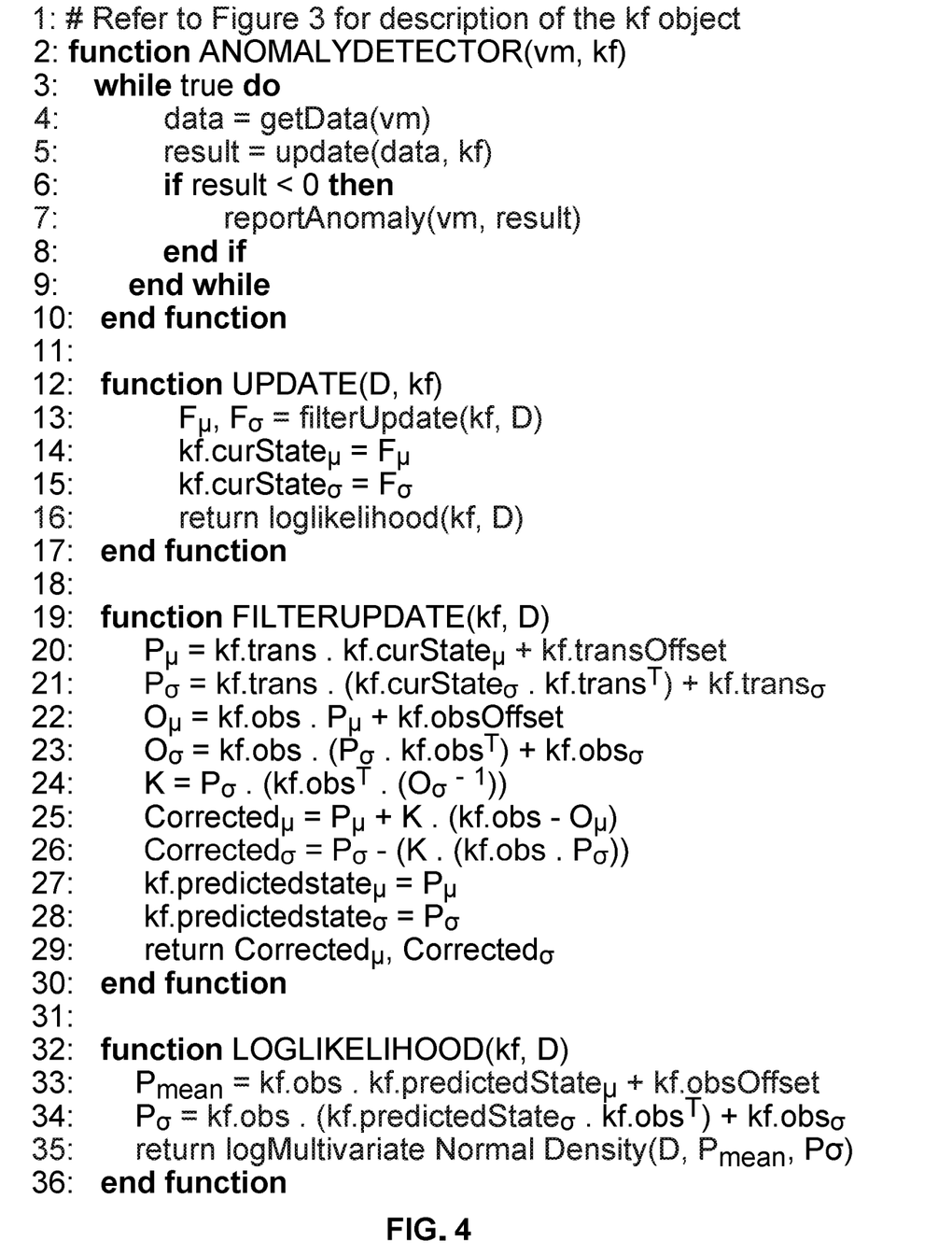
FIG. 4 shows an AnomalyDetector algorithm for use with the disclosed anomaly detection system and method.
Figure 5:
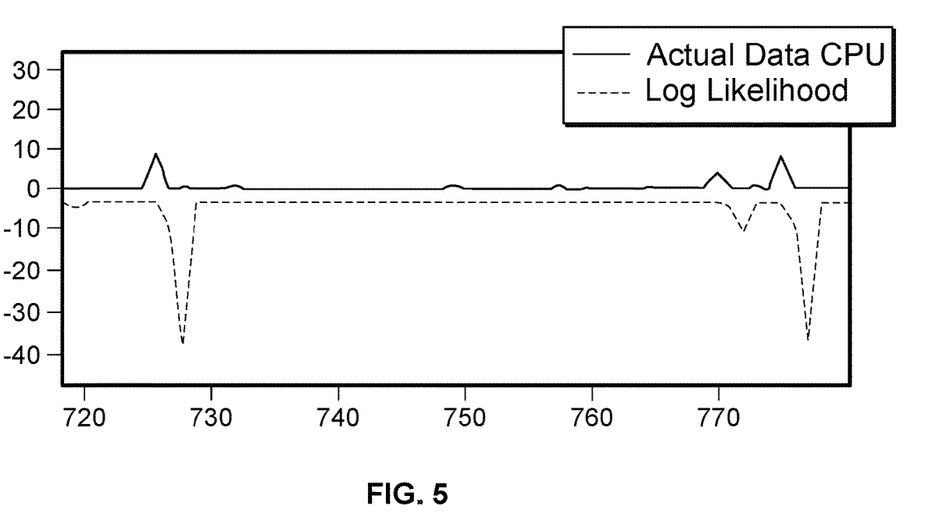
FIG. 5 shows an example of a result of a first anomaly detection simulation of the disclosed anomaly detection system and method.
Figure 6:
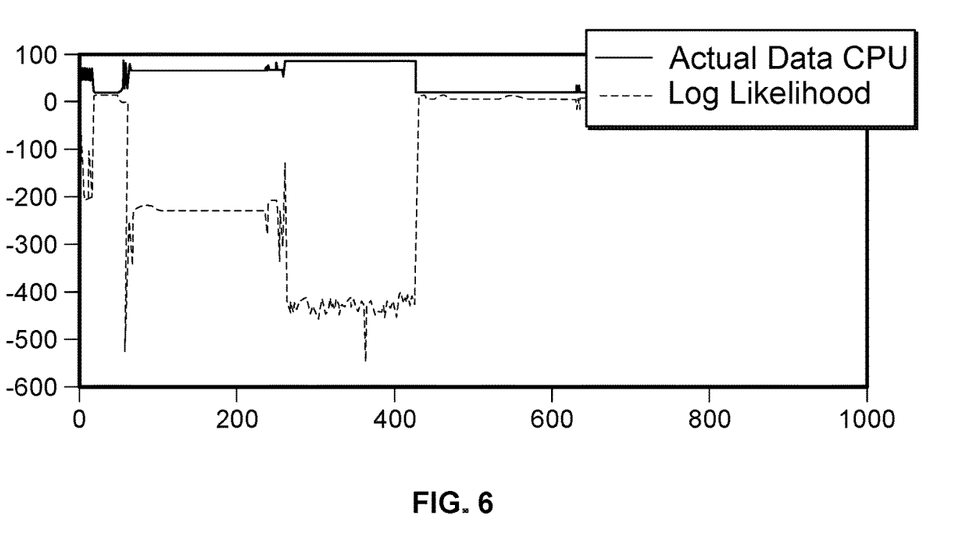
FIG. 6 shows an example of a result of a second anomaly detection simulation of the disclosed anomaly detection system and method.
Figure 7:
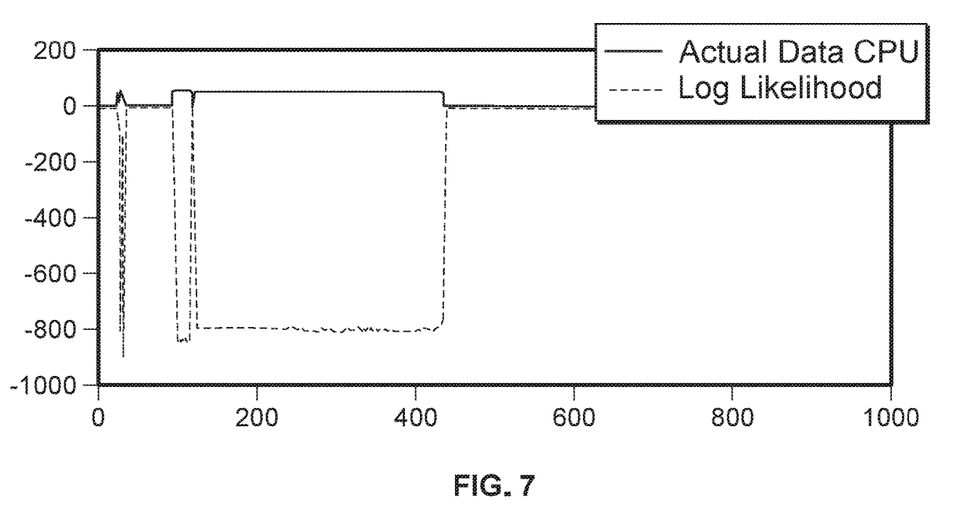
FIG. 7 shows an example of a result of a third anomaly detection simulation of the disclosed anomaly detection system and method.
Figure 8:
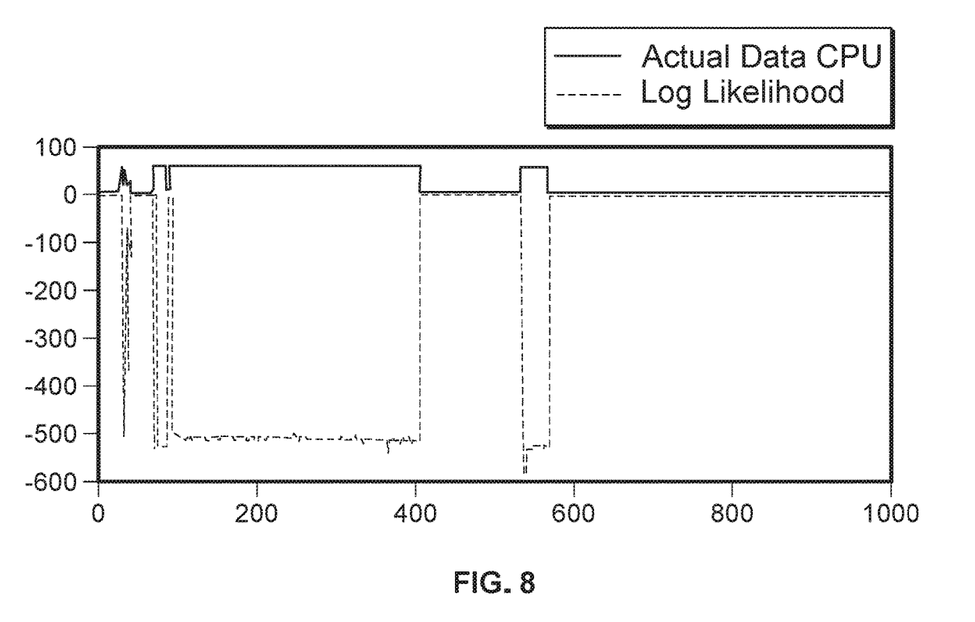
FIG. 8 shows an example of a result of a fourth anomaly detection simulation of the disclosed anomaly detection system and method.
Figure 9:
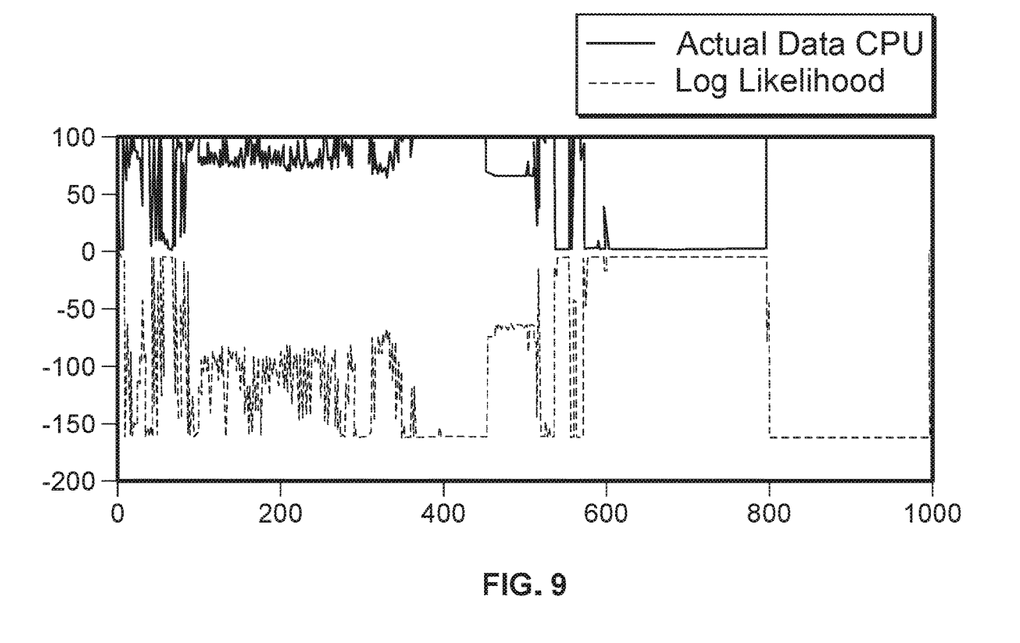
FIG. 9 shows an example of a result of a fifth anomaly detection simulation of the disclosed anomaly detection system and method.

Referring now to FIGS. 2, 3, and 4, the system and method for ongoing anomaly detection operate the AnomalyDetector algorithm in conjunction with the plurality of individual VMs in the cloud server system 200 that together may be providing virtualized cloud services. To continuously detect anomalies, the AnomalyDetector algorithm receives as input the stream of data from the VMs at step 210. The kf object stores the set of vectors and matrices needed by the Kalman Filter, summarized in FIG. 3. The state transition matrix (kf.trans) and the observation matrix (kf.obs) are initialized once for all data points. Each VM is uniquely identified by its ID. For each data point, AnomalyDetector takes as input its VM ID and the kf object.

The AnomalyDetector algorithm starts by updating the internal state based on the data point. It then runs the update function once per data point. As a part of the update function, the FilterUpdate works by applying a Kalman filter to take the current state of the system and calculate a prediction of what the mean and covariance matrices should be at step 220. It then takes the observation and the predicted matrices and applies a Kalman filter to compute the Kalman gain, which is then used to produce the corrected state matrices by way of an application of a Kalman filter at step 230. The predicted state matrices are saved to be used in a LogLikelihood function and the corrected state matrices are used in the next iteration as the current state (curState) of the system at step 240.

Then, after the FilterUpdate, the algorithm runs the Log-Likelihood function to calculate the log likelihood to determine the probability of the data point at step 250. The log likelihood is calculated by taking the predicted mean and predicted covariance matrices and providing them as input to a log multivariate normal density function (logMultivariateNormalDensity), which calculates the log of the normal density in multiple dimensions. This will return the number that needs to be compared to zero to determine if an anomaly has occurred at step 260. If the data point is very unlikely, then the algorithm will return a value less than zero to indicate that an anomaly has occurred. If an anomaly is detected, then the function, reportAnomaly, reports the anomaly by generating an anomaly reporting signal at step 270. The anomaly reporting signal is an electrical signal generated by the processor 110 to provide an indication that an anomaly has been detected, providing an answer to the question of when to migrate cloud services. The anomaly reporting signal may be transmitted to a Migration Trigger component of the '552 application.

It is contemplated that the calculation of the log likelihood may also utilize historical data which includes data points for the VMs that are from past operations of the VMs. As such historical data may be stored in the same physical and/or logical system as the processor 110 at some time well prior when it is to be used, it is appreciated that the operation of the AnomalyDetector algorithm will still only require the relatively minimal amount of data needed to apply the Kalman Filter to be transferred from the VMs to the processor 110 in real time. Furthermore, as the historical data may be updated with the data that is produced by way of the processor's 110 application of the Kalman Filter, a significantly more robust anomaly indicator may be produced.

It is contemplated that the AnomalyDetector algorithm may operate as the Anomaly Detector from '552 application. In one implementation of the '552 application, the underlying hypervisor is the Citrix® XenServer®. The Thrift™ framework is used for defining and creating services for numerous languages to implement the overall client/server architecture. Such an implementation may include a web-based dashboard to enable the end user to configure and control the client-side components, including the anomaly detection.

Referring now to FIGS. 5, 6, 7, 8, and 9, while the AnomalyDetector algorithm is designed to handle multiple variables, in the illustrated examples, only CPU utilization of the virtual machines was considered. Therefore, the AnomalyDetector takes as input a stream of CPU data of a given VM and detects anomalies. The CPU data represents the percentage of CPU used by the VM at any given time.

Stress, a program for generating workload, was used to stress the VMs to simulate the presence of anomalies in the VMs. When executed on a VM, the workload generating program spikes the utilization of the CPU and other variables. To generate the dataset for the simulations, the VMs were first run with a normal workload. Then, the Stress program was randomly run to add anomalous behaviors to the CPU utilization. Five VMs were used for the simulation. For each VM, the algorithm was run 2800 iterations for a total of 14000 iterations for the five VMs.

Five different simulations were performed, corresponding to the five selected VMs to exemplify the performance of the AnomalyDetector algorithm. For each experiment, AnomalyDetector was run on the corresponding actual dataset for the CPU and recorded the log likelihood. The results are shown in FIGS. 5, 6, 7, 8, and 9. The Kalman Filter figures are divided into two parts, the upper part (positive) and lower part (negative) on the y-axes. The upper part shows the actual measurements (% CPU) of the CPU and lower part the log likelihood. Note that the lower the log likelihood, the more anomalous the CPU data is.

In order to facilitate the analysis of the simulations, only a snapshot of the results is shown throughout the five figures. As can be seen, the five figures exhibit different behaviors in terms of anomalies detected by the algorithm. This is due to the fact that the anomalies were added randomly in the VMs. Significantly, the AnomalyDetector algorithm successfully detected most of the anomalies. Since the goal is not just finding anomalies in a single VM; rather, in a set of VMs running a given cloud service, the AnomalyDetector algorithm combines the results of all dependent VMs of the cloud service before making any decision. For these simulations, the decision to migrate is based on the simple majority rule and a likelihood threshold (between 0% and 100%). If the likelihood of anomaly of the majority of the VMs is above a threshold, then live migration of the cloud service is triggered.

In an alternate embodiment, an extension of the AnomalyDetector algorithm may be applied to RapidMiner, a graphical user interface application for machine learning and related data science, to demonstrate a clustering based anomaly detection algorithm and its performance.

It will be understood that many additional changes in the details, materials, steps and arrangement of parts, which have been herein described and illustrated to explain the nature of the invention, may be made by those skilled in the art within the principle and scope of the invention as expressed in the appended claims.

We claim:

1. A computer implemented method comprising the steps of:

providing, by a cloud server system, a plurality of virtualized cloud services through processes running over a set of virtual machines hosted on the cloud server system;

receiving, by a processor communicatively coupled with said cloud server system but at least one of physically separate or logically separate from the set of virtual machines hosted on the cloud server system, a stream of data related to said set of virtual machines, wherein said stream of data includes at least one value related to an observed state at a first time instance for each virtual machine in the set of virtual machines, at least one value related to an observed covariance at the first time instance for each virtual machine in the set of virtual machines, and at least one value related to observed noise at the first time instance for each virtual machine in the set of virtual machines;

accessing, by said processor, at least one value related to a prior state at a second time instance that precedes the first time instance for each virtual machine in the set of virtual machines;

calculating, by said processor, at least a value related to a predicted state at the first time instance for each virtual machine in the set of virtual machines and a value related to a predicted covariance at the first time instance for each virtual machine in the set of virtual machines;

calculating a log likelihood value, by said processor, for each virtual machine in the set of virtual machines, wherein said log likelihood value is calculated for each virtual machine in the set of virtual machines from said value related to the predicted state at the first time instance and said value related to the predicted covariance at the first time instance for each virtual machine in the set of virtual machines; and generating, by said processor, an anomaly reporting signal if said log likelihood value for at least one of the virtual machines in the set of virtual machines is less than zero.

2. The method of claim 1, wherein the at least one value related to the prior state at a second time instance is accessed by said processor after being received in said stream of data related to said set of virtual machines.

3. The method of claim 1, wherein the at least one value related to the prior state at a second time instance is accessed by said processor after being calculated by said processor using at least one value related to a before prior state at a third time instance that precedes the second time instance for each virtual machine in the set of virtual machines.

4. The method of claim 3, wherein the processor is configured to apply a Kalman filter to calculate said prior state.

5. The method of claim 1, wherein the processor is configured to calculate said value related to the predicted state at the first time instance for each virtual machine in the set of virtual machines using the at least one value related to the observed state at the first time instance, the at least one value related to observed noise at the first time instance, and the at least one value related to the prior state at a second time instance.

6. The method of claim 5, wherein the processor is configured to apply a Kalman filter to calculate said value related to the predicted state at the first time instance for each virtual machine in the set of virtual machines.

7. The method of claim 1, wherein the processor is configured to apply a Kalman filter to calculate said value related to the predicted state at the first time instance for each virtual machine in the set of virtual machines.

8. The method of claim 1, wherein the processor is configured to calculate said value related to the predicted covariance at the first time instance for each virtual machine in the set of virtual machines using the at least one value related to the observed state at the first time instance, the value related to the predicted covariance at the first time instance, and the at least one value related to the observed covariance at the first time instance.

9. The method of claim 8, wherein the processor is configured to apply a Kalman filter to calculate said value related to the predicted covariance at the first time instance for each virtual machine in the set of virtual machines.

10. The method of claim 1, wherein the processor is configured to apply a Kalman filter to calculate said value related to the predicted covariance at the first time instance for each virtual machine in the set of virtual machines.

11. The method of claim 1, wherein the processor is configured to calculate the log likelihood value using a log multivariate normal density function.

12. The method of claim 1, wherein the processor is configured to generate the anomaly reporting signal if said log likelihood value for a plurality of the virtual machines in the set of virtual machines is less than zero.

13. A computer implemented method comprising the steps of:

providing, by a cloud server system, a plurality of virtualized cloud services through processes running over a set of virtual machines hosted on the cloud server system;

receiving, by a processor communicatively coupled with said cloud server system but at least one of physically separate or logically separate from the set of virtual machines hosted on the cloud server system, a stream of data related to said set of virtual machines, wherein said stream of data includes at least one value related to an observed state at a first time instance for each virtual machine in the set of virtual machines, at least one value related to an observed covariance at the first time instance for each virtual machine in the set of virtual machines, and at least one value related to observed noise at the first time instance for each virtual machine in the set of virtual machines;

accessing, by said processor, at least one value related to a prior state at a second time instance that precedes the first time instance for each virtual machine in the set of virtual machines, wherein the at least one value related to the prior state at a second time instance is accessed by said processor after being calculated by said processor using at least one value related to a before prior state at a third time instance that precedes the second time instance for each virtual machine in the set of virtual machines;

calculating, by said processor, at least a value related to a predicted state at the first time instance for each virtual machine in the set of virtual machines and a value related to a predicted covariance at the first time instance for each virtual machine in the set of virtual machines;

wherein the processor is configured to calculate said value related to the predicted state at the first time instance for each virtual machine in the set of virtual machines using the at least one value related to the observed state at the first time instance, the at least one value related to observed noise at the first time instance, and the at least one value related to the prior state at a second time instance;

wherein the processor is configured to calculate said value related to the predicted covariance at the first time instance for each virtual machine in the set of virtual machines using the at least one value related to the observed state at the first time instance, the value related to the predicted covariance at the first time instance, and the at least one value related to the observed covariance at the first time instance;

calculating a log likelihood value, by said processor, for each virtual machine in the set of virtual machines, wherein said log likelihood value is calculated for each virtual machine in the set of virtual machines from said value related to the predicted state at the first time instance and said value related to the predicted covariance at the first time instance for each virtual machine in the set of virtual machines; and generating, by said processor, an anomaly reporting signal if said log likelihood value for at least one of the virtual machines in the set of virtual machines is less than zero.

14. The method of claim 13, wherein the processor is configured to apply a Kalman filter to calculate said prior state.

15. The method of claim 13, wherein the processor is configured to apply a Kalman filter to calculate said value related to the predicted state at the first time instance for each virtual machine in the set of virtual machines.

16. The method of claim 13, wherein the processor is configured to apply a Kalman filter to calculate said value related to the predicted covariance at the first time instance for each virtual machine in the set of virtual machines.

17. The method of claim 13, wherein the processor is configured to calculate the log likelihood value using a log multivariate normal density function.

18. The method of claim 13, wherein the processor is configured to generate the anomaly reporting signal if said log likelihood value for a plurality of the virtual machines in the set of virtual machines is less than zero.

19. A system comprising:
- a cloud server system configured to provide a plurality of virtualized cloud services through processes running over a set of virtual machines hosted on the cloud server system;
- a processor communicatively coupled with said cloud server system but at least one of physically separate and logically separate from the set of virtual machines hosted on the cloud server system, wherein said processor is configured to receive a stream of data related to said set of virtual machines;
- wherein said stream of data includes at least one value related to an observed state at a first time instance for each virtual machine in the set of virtual machines, at least one value related to an observed covariance at the first time instance for each virtual machine in the set of virtual machines, and at least one value related to observed noise at the first time instance for each virtual machine in the set of virtual machines;
- wherein said processor is configured to access at least one value related to a prior state at a second time instance that precedes the first time instance for each virtual machine in the set of virtual machines;
- wherein said processor is configured to calculate at least a value related to a predicted state at the first time instance for each virtual machine in the set of virtual machines through the application of a Kalman filter and a value related to a predicted covariance at the first time instance for each virtual machine in the set of virtual machines through the application of a Kalman filter;
- wherein said processor is configured to calculate a log likelihood value for each virtual machine in the set of virtual machines using a log multivariate normal density function, wherein said log likelihood value is calculated for each virtual machine in the set of virtual machines from said value related to the predicted state at the first time instance and said value related to the predicted covariance at the first time instance for each virtual machine in the set of virtual machines; and
- wherein said processor is configured to generate an anomaly reporting signal if said log likelihood value for at least one of the virtual machines in the set of virtual machines is less than zero.

20. The system of claim 19, wherein the processor is configured to generate the anomaly reporting signal if said log likelihood value for a plurality of the virtual machines in the set of virtual machines is less than zero.

* * * * *